(12) United States Patent
Morooka (10) Patent No.: US 10,133,041 B2
(45) Date of Patent: Nov. 20, 2018

(54) ZOOM LENS AND IMAGE PICKUP APPARATUS USING THE SAME

(71) Applicant: OLYMPUS CORPORATION, Tokyo (JP)

(72) Inventor: Masaru Morooka, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 294 days.

(21) Appl. No.: 15/090,837

(22) Filed: Apr. 5, 2016

(65) Prior Publication Data

US 2017/0090166 A1   Mar. 30, 2017

(30) Foreign Application Priority Data

Sep. 24, 2015 (JP) ................. 2015-186991

(51) Int. Cl.
*G02B 15/14* (2006.01)
*G02B 15/173* (2006.01)
*G02B 15/20* (2006.01)

(52) U.S. Cl.
CPC .......... *G02B 15/173* (2013.01); *G02B 15/20* (2013.01)

(58) Field of Classification Search
CPC .... G02B 15/16; G02B 15/167; G02B 15/173; G02B 15/20; G02B 15/24; G02B 15/28; G02B 15/14
USPC ......... 359/676–688, 694–698, 771, 772, 774
See application file for complete search history.

(56) References Cited

U.S. PATENT DOCUMENTS

| | | | |
|---|---|---|---|
| 7,248,417 B2 | 7/2007 | Miyazawa | |
| 7,515,353 B2 | 4/2009 | Kimura | |
| 8,570,663 B2 | 10/2013 | Saito | |
| 2013/0141798 A1 | 6/2013 | Hagiwara | |
| 2013/0155312 A1* | 6/2013 | Matsui | G02B 13/18 348/345 |
| 2014/0036138 A1* | 2/2014 | Komatsu | G02B 13/18 348/345 |

FOREIGN PATENT DOCUMENTS

| | | |
|---|---|---|
| JP | 4695912 | 6/2011 |
| JP | 5028104 | 9/2012 |
| JP | 2013-050519 | 3/2013 |
| JP | 2013-117656 | 6/2013 |
| JP | 5318262 | 10/2013 |

* cited by examiner

*Primary Examiner* — Stephone B Allen
*Assistant Examiner* — Travis Fissel
(74) *Attorney, Agent, or Firm* — Hunton Andrews Kurth LLP (57) ABSTRACT

A zoom lens includes in order from an object side, a first lens unit having a positive refractive power, a second lens unit having a negative refractive power, a third lens unit having a positive refractive power, and a fourth lens unit having a positive refractive power, and at the time of zooming, the first lens unit is fixed, and at least two lens units positioned on an image side of the first lens unit move, and the first lens unit includes a plurality of lenses, and also has a cemented lens, and the cemented lens are included in the plurality of lenses, and the plurality of lenses includes one negative lens and three positive lenses, and the following conditional expressions (1), (2), and (3) are satisfied.

$$1.5 < ndp < 1.65 \qquad (1)$$

$$65 < vdp < 95 \qquad (2)$$

$$65 < vdp\text{ave} < 95 \qquad (3)$$

11 Claims, 8 Drawing Sheets

ZOOM LENS AND IMAGE PICKUP APPARATUS USING THE SAME

CROSS-REFERENCE TO RELATED APPLICATION

The present application is based upon and claims the benefit of priority from the prior Japanese Patent Application No. 2015-186991 filed on Sep. 24, 2015; the entire contents of which are incorporated herein by reference.

BACKGROUND OF THE INVENTION

Field of the Invention

The present invention relates to a zoom lens and an image pickup apparatus using the same, and particularly to a zoom lens that is most appropriate for cameras such as a video camera, a digital camera, a TV (television) camera, and a surveillance camera.

Description of the Related Art

There are various image pickup apparatuses such as a video camera, a digital camera, a TV camera, and a surveillance camera. These image pickup apparatuses are sought to have a small size, a capability to capture an image with a high image quality, and an optical system having a high zooming.

As a zoom lens suitable for such image pickup apparatuses, a zoom lens that includes four lens units is available. For instance, as a four-unit zoom lens, a zoom lens which includes in order from an object side, a first lens unit having a positive refractive power, a second lens unit having a negative refractive power, a third lens unit having a positive refractive power, and a fourth lens unit having a positive refractive power, has hitherto been known.

In this four-unit zoom lens, at the time of zooming from a wide angle end to a telephoto end, the first lens unit and the third lens unit are fixed, and the second lens unit and the fourth lens unit move. The zooming is primarily carried out by moving the second lens unit from the object side to an image side, and a fluctuation in an image plane that occurs due to the movement of the second lens unit is corrected by moving the fourth lens unit. Moreover, the focusing is carried out by moving the fourth lens unit in an optical axial direction.

In recent years, as an image to be used in a field of broadcasting, an image having a high resolution (an image having a high-definition) has been sought. For acquiring such image, an image pickup element with a large number of pixels has been adopted in broadcast equipment. A zoom lens is also required be compatible with such broadcast equipment. For this, the zoom lens is sought to have a high resolving power. Moreover, in order that photography at even darker location becomes possible, the zoom lens is sought to have a small F-number.

As a zoom lens having a comparatively higher resolving power and a comparatively smaller F-number, zoom lenses in Japanese Patent Publication No. 4695912, Japanese Patent Publication No. 5028104, Japanese Patent Publication No. 5318262, Japanese Patent Application Laid-open Publication No. 2013-050519, and Japanese Patent Application Laid-open Publication No. 2013-117656 have been known. These zoom lenses include in order from an object side, a first lens unit having a positive refractive power, a second lens unit having a negative refractive power, a third lens unit having a positive refractive power, and a fourth lens unit having a positive refractive power.

In the zoom lens according to Japanese Patent Publication No. 4695912, at the time of zooming, the first lens unit and the third lens unit are fixed, and the second lens unit and the fourth lens unit move. The first lens unit includes one cemented lens and one single lens.

In the zoom lens according to Japanese Patent Publication No. 5028104, at the time of zooming, the first lens unit and the third lens unit are fixed, and the second lens unit and the fourth lens unit move. The first lens unit includes either, one cemented lens and one single lens, or includes one cemented lens.

In the zoom lens according to Japanese Patent Publication No. 5318262, at the time of zooming, the first lens unit and the third lens unit are fixed, and the second lens unit and the fourth lens unit move. The first lens unit includes either, one cemented lens and one single lens, or includes one cemented lens, or includes one single lens.

In the zoom lens according to Japanese Patent Application Laid-open Publication No. 2013-050519 and Japanese Patent Application Laid-open Publication No. 2013-117656, at the time of zooming, the first lens unit and the third lens unit are fixed, and the second lens unit and the fourth lens unit move. The first lens unit includes one cemented lens and two single lenses.

SUMMARY OF THE INVENTION

A zoom lens according to an aspect of the present invention comprises in order from an object side,
a first lens unit having a positive refractive power,
a second lens unit having a negative refractive power,
a third lens unit having a positive refractive power, and
a fourth lens unit having a positive refractive power,
wherein
at the time of zooming from a wide angle end to a telephoto end, the first lens unit is fixed, and at least two lens units positioned on an image side of the first lens unit move, and
the first lens unit includes a plurality of lenses, and also has a cemented lens, and
a negative lens and a positive lens in the cemented lens are included in the plurality of lenses, and
the plurality of lenses includes at least one negative lens, and at least three positive lenses, and
the following conditional expressions (1), (2), and (3) are satisfied.

$$1.5 < ndp < 1.65 \quad (1)$$

$$65 < vdp < 95 \quad (2)$$

$$65 < vdpave < 95 \quad (3)$$

where,
ndp denotes a refractive index for a d-line of the positive lens in the cemented lens,
vdp denotes Abbe's number for the positive lens in the cemented lens, and
vdpave denotes an average Abbe's number for the positive lenses in the plurality of lenses.

A zoom lens according to another aspect of the present invention comprises in order from an object side,
a first lens unit having a positive refractive power,
a second lens unit having a negative refractive power,
a third lens unit having a positive refractive power, and
a fourth lens unit having a positive refractive power,
wherein at the time of zooming from a wide angle end to a telephoto end, the first lens unit is fixed, and at least two lens units that are positioned on an image side of the first lens unit move, and the following conditional expressions (4) and (5) are satisfied.

$$4.0 \leq f1/fw < 9.0 \tag{4}$$

$$-1.2 \leq f2/fw < -0.6 \tag{5}$$

where, f1 denotes a focal length of the first lens unit,
f2 denotes a focal length of the second lens unit, and
fw denotes a focal length at the wide angle end of the overall zoom lens system.

An image pickup apparatus according to the present invention comprises,
the abovementioned zoom lens, and
an image pickup element.

DETAILED DESCRIPTION OF THE INVENTION

Prior to explaining examples, action and effect of embodiments according to certain aspects of the present invention will be described below. An action and effect of the present embodiment will be described specifically by describing concrete examples. However, similar to a case of the examples to be described later, the aspects exemplified thereof are some of the aspects included in the present invention, and there is a large number of variations in these aspects. Therefore, the present invention is not restricted to the aspects that are exemplified.

A zoom lens according to a first embodiment of the present invention includes in order from an object side, a first lens unit having a positive refractive power, a second lens unit having a negative refractive power, a third lens unit having a positive refractive power, and a fourth lens unit having a positive refractive power, and at the time of zooming from a wide angle end to a telephoto end, the first lens unit is fixed, and at least two lens units positioned on an image side of the first lens unit move, and the first lens unit includes a plurality of lenses, and also has a cemented lens, and a negative lens and a positive lens in the cemented lens are included in the plurality of lenses, and the plurality of lenses includes at least one negative lens, and at least three positive lenses, and the following conditional expressions (1), (2), and (3) are satisfied.

$$1.5 < ndp < 1.65 \tag{1}$$

$$65 < vdp < 95 \tag{2}$$

$$65 < vdpave < 95 \tag{3}$$

where, ndp denotes a refractive index for a d-line of the positive lens in the cemented lens,
vdp denotes Abbe's number for the positive lens in the cemented lens, and
vdpave denotes an average Abbe's number for the positive lenses in the plurality of lenses.

The zoom lens according to the first embodiment is a zoom lens of positive-lead type. In the zoom lens of positive-lead type, an arrangement is such that a lens unit having a positive refractive power is disposed nearest to an object. Adopting such arrangement is advantageous for securing a large zoom ratio. Moreover, by adopting such arrangement, a lens arrangement of an optical system becomes a lens arrangement which is preferable as a zoom lens having a wide angle and high zooming.

Moreover, at the time of zooming from the wide angle end to the telephoto end, the first lens unit is fixed. By letting the first lens unit to be fixed all the time, with respect to an image plane, a manufacturing error is reduced and a mechanical arrangement is simplified.

Moreover, at the time of zooming, at least two lens unit positioned on the image side of the first lens unit move. By moving the two lens units, it is possible to carry out zooming, and correction of an image-plane fluctuation resulted from zooming. In the zoom lens according to the first embodiment, the zooming is carried out primarily by moving the second lens unit toward the image side at the time of zooming from the wide angle end to the telephoto end.

In a case of making large an aperture of a zoom lens having a large zoom ratio, it becomes important to optimize the refractive power of the first lens unit and the refractive power of the second lens unit. This is because, the refractive power of the first lens unit and the refractive power of the second lens unit have an effect on securing an appropriate amount of movement of the second lens unit, and balancing a maintenance of a high imaging performance throughout the entire zoom range and a size of the optical system.

Particularly, for optimizing the refractive power of the first lens unit, a chromatic aberration in the first lens unit is to be corrected favorably. For this, in the zoom lens according to the first embodiment, the first lens unit includes the plurality of lenses. Concretely, the first lens unit includes at least one negative lens and at least three positive lenses. By making such arrangement, it is possible to correct the chromatic aberration in the first lens unit favorably.

Moreover, in the first lens unit, the cemented lens, which includes the negative lens and the positive lens, is disposed. By doing so, it is possible to correct favorably a chromatic aberration of magnification in particular. The number of cemented lenses is not restricted to one.

As aforementioned, the first lens unit includes the plurality of lenses. The number of negative lenses and the number of positive lenses in the cemented lens are included in the number of the plurality of lenses.

Moreover, conditional expressions (1), (2), and (3) are satisfied. Conditional expressions (1), (2), and (3) are conditional expressions for setting appropriately, a refractive index and Abbe's number for the positive lens in the first lens unit. The refractive index and Abbe's number are a refractive index and Abbe's number for a material to be used for the lens. By satisfying conditional expressions (1), (2), and (3), it is possible to correct the chromatic aberration in the first lens unit favorably.

Conditional expression (1) is a conditional expression that regulates the refractive index of the positive lens included in the cemented lens (hereinafter, referred to as 'positive lens in the cemented lens') in the first lens unit. By satisfying conditional expression (1), it is possible to optimize the refractive index of the positive lens in the cemented lens.

In a case in which, the plurality of cemented lenses is disposed in the first lens unit, a positive lens of any one of the cemented lenses may satisfy conditional expression (1).

When falling below a lower limit value of conditional expression (1), the refractive power of the positive lens in the cemented lens is to be made large. As a result, correction of a spherical aberration becomes difficult. When exceeding an upper limit value of conditional expression (1), the refractive power of the positive lens in the cemented lens becomes small. As a result, correction of a longitudinal chromatic aberration at the telephoto end and correction of a chromatic aberration of magnification at the telephoto end become difficult.

Conditional expression (2) is a conditional expression which regulates Abbe's number for the positive lens in the cemented lens. By satisfying conditional expression (2), it is possible to optimize Abbe's number for the positive lens in the cemented lens.

When falling below a lower limit value of conditional expression (2), correction of the longitudinal chromatic aberration at the telephoto end and correction of the chromatic aberration of magnification at the telephoto end become difficult. When exceeding an upper limit value of conditional expression (2), a material having a low dispersion and low refractive index is to be used for the lens. In this case, a curvature of the positive lens in the cemented lens is to be made large. Due to this, correction of the spherical aberration becomes difficult.

Conditional expression (3) is a conditional expression which regulates the average Abbe's number for the positive lenses in the first lens unit. By satisfying conditional expression (3), it is possible to optimize the average Abbe's number for the positive lens in the first lens unit.

The first lens unit includes the plurality of lenses, and the plurality of lenses includes at least three positive lenses. Therefore, the average Abbe's number for the positive lenses in the first lens unit is calculated from all the positive lenses included in the plurality of lenses.

Moreover, in the plurality of lenses, the positive lens and the negative lens in the cemented lens are included. Therefore, the positive lenses in the cemented lens are also used for calculating the average Abbe's number for the positive lenses in the first lens unit.

When falling below a lower limit value of conditional expression (3), for correcting the chromatic aberration favorably, the refractive power of each positive lens is to be made large. As a result, correction of the spherical aberration at the telephoto end and correction of a coma at the telephoto end become difficult.

When exceeding an upper limit value of conditional expression (3), a material having a low dispersion, and a low refractive index is to be used for the lens. In this case, a curvature of each positive lens is to be made large. Due to this, correction of the spherical aberration becomes difficult.

A zoom lens according to a second embodiment includes in order from an object side, a first lens unit having a positive refractive power, a second lens unit having a negative refractive power, a third lens unit having a positive refractive power, and a fourth lens unit having a positive refractive power, and at the time of zooming from a wide angle end to a telephoto end, the first lens unit is fixed, and at least two lens units that are positioned on an image side of the first lens unit move, and the following conditional expressions (4) and (5) are satisfied.

$$4.0 < f1/fw < 9.0 \tag{4}$$

$$-1.2 < f2/fw < -0.6 \tag{5}$$

where, f1 denotes a focal length of the first lens unit, f2 denotes a focal length of the second lens unit, and fw denotes a focal length at the wide angle end of the overall zoom lens system.

The zoom lens according to the second embodiment includes four lens units similarly as the zoom lens according to the first embodiment. Moreover, movement of the lens units at the time of zooming in the zoom lens according to the second embodiment is also similar to the movement of the lens units in the zoom lens according to the first embodiment. Therefore, technical description of these points is omitted here.

In the zoom lens according to the second embodiment, conditional expressions (4) and (5) are satisfied.

Conditional expression (4) is a conditional expression in which, the refractive power of the first lens unit is regulated. Conditional expression (5) is a conditional expression in which, the refractive power of the second lens unit is regulated.

As aforementioned, in a case of making large an aperture of the zoom lens having a large zoom ratio, it becomes important to optimize the refractive power of the first lens unit and the refractive power of the second lens unit. This is because, the refractive power of the first lens unit and the refractive power of the second lens unit have an effect on securing an appropriate amount of movement of the second lens unit, and balancing a maintenance of a high imaging performance throughout the entire zoom range and a size of the optical system.

By satisfying conditional expression (4), it is possible to optimize the refractive power of the first lens unit.

When falling below a lower limit value of conditional expression (4), the refractive power of the first lens unit becomes large. Therefore, falling below the lower limit value of conditional expression (4) is advantageous for small-sizing of the optical system. However, in a case in which, an aperture of the optical system is made large, correction of the spherical aberration at the telephoto end becomes difficult, and also correction of the chromatic aberration throughout the entire zoom range becomes difficult.

When exceeding an upper limit value of conditional expression (4), the refractive power of the first lens unit becomes small. Therefore, it becomes difficult to achieve a large zoom ratio while maintaining a large aperture and small-sized. Large zoom ratio refers to a zoom ratio of 20 times or higher, for example.

By satisfying conditional expression (5), it is possible to optimize the refractive power of the second lens unit.

When falling below a lower limit value of conditional expression (5), the refractive power of the second lens unit becomes small. In this case, an angle of incidence of a light ray incident on the third lens unit becomes small. Therefore, even when an aperture of the optical system is made large, it is possible to correct an aberration favorably. In such manner, falling below the lower limit value of conditional expression (5) becomes advantageous for achieving both of, making the aperture of the optical system large and correcting an aberration favorably.

However, when falling below the lower limit value of conditional expression (5), since an amount of movement of the second lens unit at the time of zooming becomes excessively large, the overall length of the optical system becomes long. Moreover, since a lens diameter of the first lens unit becomes large, it becomes difficult to achieve a large zoom ratio while maintaining small-sizing of the optical system. Large zoom ratio refers to a zoom ratio of 20 times or higher for example.

When exceeding an upper limit value of conditional expression (5), the amount of movement of the second lens unit becomes small. Therefore, exceeding the upper limit value of conditional expression (5) becomes advantageous for small-sizing of the optical system. However, when the aperture of the optical system is made large, the coma and astigmatism become substantial.

In the zoom lens according to the second embodiment, it is preferable that the first lens unit includes a plurality of lenses, and also has a cemented lens, and a negative lens and a positive lens in the cemented lens are included in the plurality of lenses, and the plurality of lenses includes at least one negative lens and at least three positive lenses, and the abovementioned conditional expressions (1), (2), and (3) are satisfied.

Since a technical significance of the arrangement of the first lens unit, and technical significance of conditional expressions (1), (2), and (3) have already been explained, description thereof is omitted here.

In the zoom lens according to the first embodiment and the zoom lens according to the second embodiment (hereinafter, referred to as 'zoom lens according to the present embodiment'), at least one lens unit may be provided on the image side of the fourth lens unit. By doing so, it becomes possible to set a position of an exit pupil to more appropriate position.

In the zoom lens according to the present embodiment, focusing may be carried out by moving the fourth lens unit. At the time of focusing from an object at infinity to an object at a close distance, it is preferable to move the fourth lens unit toward the object side.

In the zoom lens according to the present embodiment, it is preferable that the second lens unit includes at least three negative lenses and one positive lens.

In the zoom lens according to the present embodiment, the second lens unit having a negative refractive power is let to have a large zooming effect. Therefore, when the refractive power is compared in terms of an absolute value, the refractive power of the second lens unit is relatively larger than the refractive power of the other lens unit. As a result, various aberrations are more susceptible to occur in the second lens unit as compared to the other lens unit. The other lens unit refers to a lens unit having a positive refractive power, and is the first lens unit, the third lens unit, and the fourth lens unit for example.

Therefore, the second lens unit is arranged to include at least three negative lenses and at least one positive lens. By making such arrangement, it is possible to distribute the negative refractive power to a plurality of lenses. As a result, it is possible to correct favorably the astigmatism and the coma at the wide angle end.

Moreover, a cemented lens of a positive lens and a negative lens may be used in the second lens unit. By doing so, it is possible to correct the chromatic aberration favorably.

In the zoom lens according to the present embodiment, it is preferable that the fourth lens unit includes one positive lens, and moves at the time of zooming from the wide angle end to the telephoto end.

As aforementioned, in the zoom lens according to the present embodiment, the zooming is primarily carried out by the second lens unit. Therefore, by moving the fourth lens unit at the time of zooming, a fluctuation in the image plane, which results from the zooming of the second lens unit, is corrected. Furthermore, by moving the fourth lens unit, it is possible to make the fourth lens unit bear a part of the zooming effect. As a result, the negative refractive power in the second lens unit does not become excessively large.

Moreover, by making an arrangement such that the fourth lens unit includes one lens, it is possible to make the fourth lens unit light-weight. By making the fourth lens unit light-weight, it is possible to reduce a load of a driving force at the time of zooming, and to make an arrangement of a drive mechanism compact.

Furthermore, in a case of carrying out focusing by the fourth lens unit, when the fourth lens unit includes one lens, it is possible to move the fourth lens unit at a high speed. In such manner, arranging the fourth lens unit to include one lens is advantageous for high-speed focusing.

In the zoom lens according to the present embodiment, it is preferable that the third lens unit includes in order from the object side, a first sub lens unit having a positive refractive power, a second sub lens unit having a positive refractive power, and a third sub lens unit having a negative refractive power, and the second sub lens unit includes at least one negative lens and at least one positive lens, and an image forming position is changed by moving the third sub lens unit in a direction perpendicular to an optical axis.

In the zoom lens according to the present embodiment, when the aperture of the optical system is made large, both a height of an axial marginal light ray and a height of an off-axis light ray become high. Therefore, an effective aperture of the third lens unit is susceptible to become large.

Therefore, the third lens unit includes three sub lens units. Moreover, two sub lens units having a positive refractive power are disposed on the object side. In other words, the first sub lens unit having a positive refractive power and the second sub lens unit having a positive refractive power are disposed in order from the object side.

By doing so, it is possible to distribute the positive refractive power between the two sub lens units. Accordingly, it is possible to make a curvature of each positive lens in the third lens unit small. As a result, it is possible correct the spherical aberration favorably.

Moreover, the third sub lens unit having a negative refractive power is disposed nearest to an image in the third lens unit. By doing so, it is possible to secure an appropriate back focus.

In such manner, in the zoom lens according to the present embodiment, the arrangement of the third lens unit is an arrangement that enables to correct the spherical aberration favorably, and all the more, to make it easy to secure an appropriate back focus.

Here, it is preferable to use at least one aspheric surface in the first sub lens unit. In the first sub lens unit, the height of a light ray is high. Therefore, by using at least one aspheric surface in the first sub lens unit, it is possible to correct the spherical aberration favorably.

Moreover, in the third lens unit, it is preferable to make a curvature on the object side of at least one negative lens smaller as compared to a curvature on the image side of the negative lens. Alternatively, it is preferable to make a shape of a negative lens to be a shape having convex surface directed toward the object side.

By doing so, when an off-axis light ray is incident on the negative lens, it is possible to make the angle of incidence small. Therefore, it is possible to correct a chromatic coma favorably.

Furthermore, in the zoom lens according to the present embodiment, the third sub lens unit is moved in a direction perpendicular to the optical axis. By doing so, it is possible to correct optically a blur of an optical image that occurs when the optical system is shaken.

In the zoom lens according to the present embodiment, deterioration of the spherical aberration upon making the aperture of the optical system large is suppressed by the first sub lens unit and the second sub lens unit. Therefore, when any one of the first sub lens unit and the second sub lens unit is moved in the direction perpendicular to the optical axis, the deterioration of the spherical aberration cannot be suppressed. For this reason, it is not desirable to move the first sub lens unit or the second sub lens unit in the direction perpendicular to the optical axis.

Whereas, when the absolute values of the refractive power are compared, the refractive power of the third sub lens unit is relatively smaller as compared to the refractive power of the first sub lens unit and the refractive power of the second sub lens unit. Moreover, the third sub lens unit does not bear a part in correction of the spherical aberration. Therefore, even when the third sub lens unit having a negative refractive power is moved in the direction perpendicular to the optical axis, the spherical aberration and other aberrations are not deteriorated that much.

Moreover, it is possible to form the third sub lens unit by a lesser number of lenses. Accordingly, it is possible to make small a size of a mechanism that moves the lens unit in the direction perpendicular to the optical axis, or in other words, it is possible to make small a size of an image-blur correcting mechanism.

In the zoom lens according to the present embodiment, it is preferable that the third sub lens unit includes one negative lens.

As aforementioned, by moving the third sub lens unit in the direction perpendicular to the optical axis, it is possible to correct optically a blur of an optical image that occurs when the optical system is shaken. Therefore, by letting the third sub lens unit include one negative lens, it is possible to make the third sub lens unit small-sized and light-weight.

As a result, at the time of correcting the image-blur, it is possible to reduce a drive load of the drive mechanism, and also it is possible to make an arrangement of the drive mechanism compact. Furthermore, since it is possible to improve a followability of the third sub lens unit with respect to the blur, improving an image-blur correcting function becomes possible.

An image pickup apparatus according to the present embodiment includes the aforementioned zoom lens, and an image pickup element.

According to the image pickup apparatus according to the present embodiment, it is possible to make an apparatus main-body small-sized, and furthermore, it is possible to achieve an image having a high image quality even by photographing at a dark location.

It is preferable that the following conditional expressions (1'), (2'), (3'), (4'), and (5') are satisfied instead of the aforementioned conditional expressions (1), (2), (3), (4), and (5).

$$1.52 < ndp < 1.58 \quad (1')$$

$$70 < vdp < 85 \quad (2')$$

$$70 < vdp\text{ave} < 90 \quad (3')$$

$$6 < f1/fw < 8 \quad (4')$$

$$-1.1 < f2/fw < -0.8 \quad (5')$$

The aforementioned zoom lens and the image pickup apparatus may satisfy a plurality of arrangements simultaneously. Making such arrangement is preferable for achieving a favorable imaging performance and an optical apparatus. Moreover, combinations of preferable arrangements are voluntary. Furthermore, regarding each conditional expression, only an upper limit value or a lower limit value of a numerical range of a further restricted conditional expression may be restricted.

Examples of zoom lenses will be described below in detail by referring to the accompanying diagrams. However, the present invention is not restricted to the examples described below.

Figure 1A:
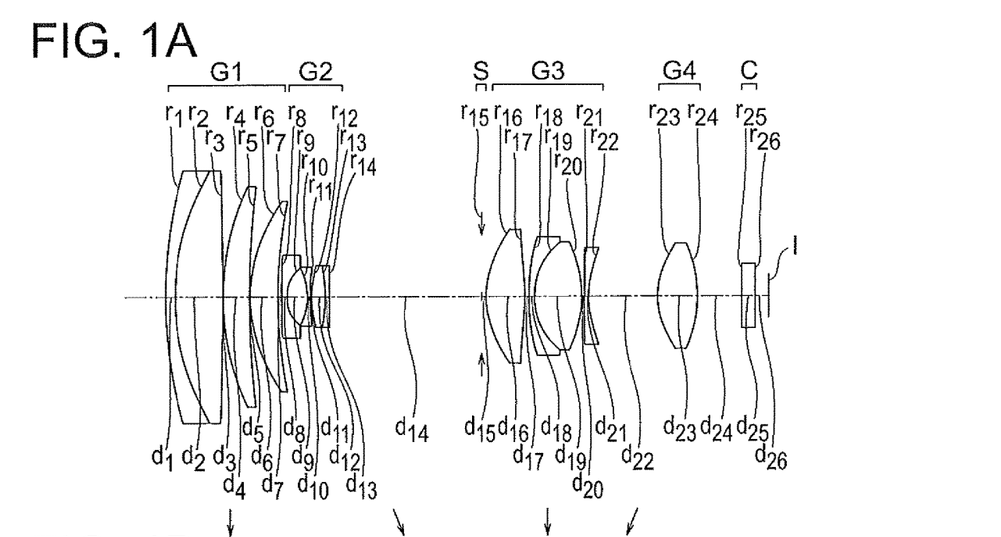
FIG. 1A, FIG. 1B, and FIG. 1C are lens cross-sectional views at the time of focusing to an object at infinity of a zoom lens according to an example 1.
Figure 1B:
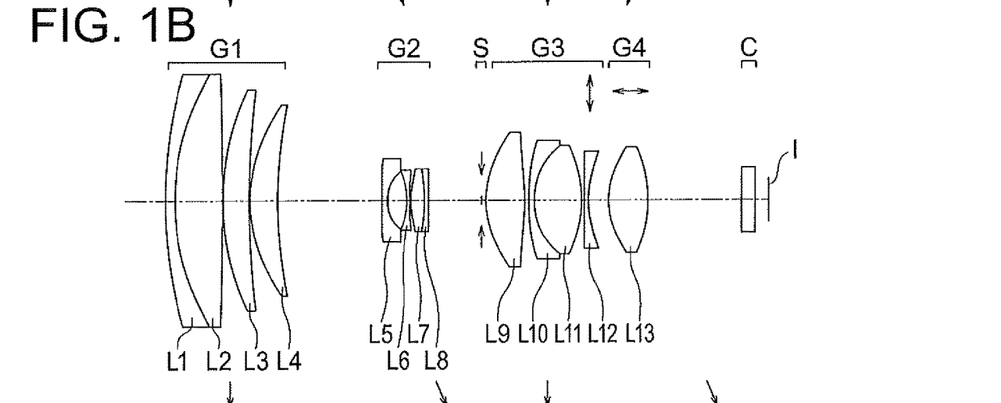
Figure 1C:
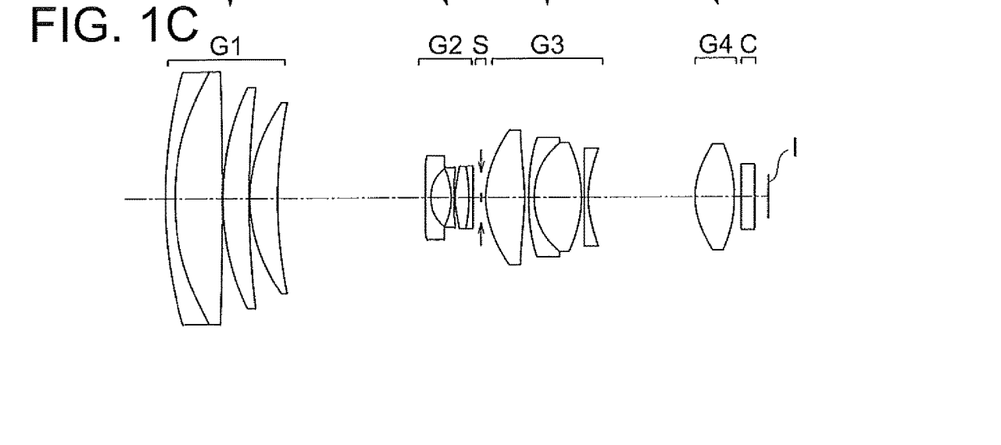
Figure 2A:
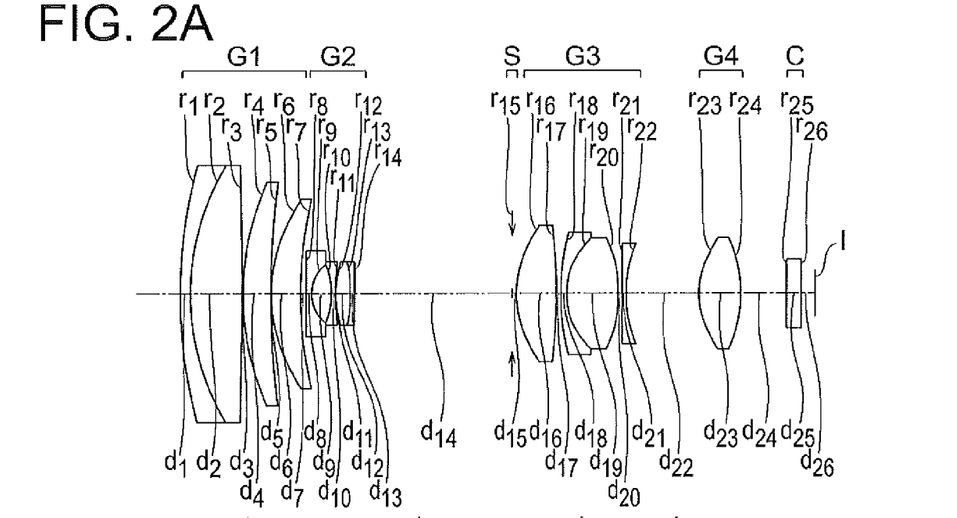
FIG. 2A, FIG. 2B, and FIG. 2C are lens cross-sectional views at the time of focusing to an object at infinity of a zoom lens according to an example 2.
Figure 2B:
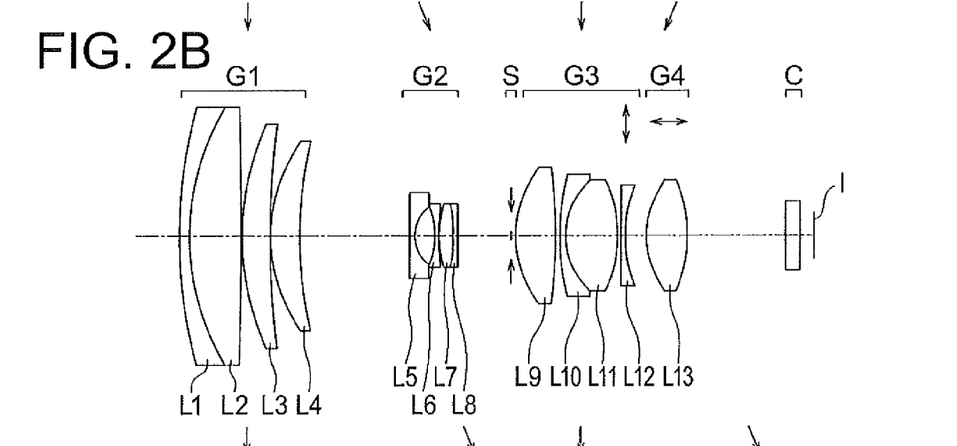
Figure 2C:
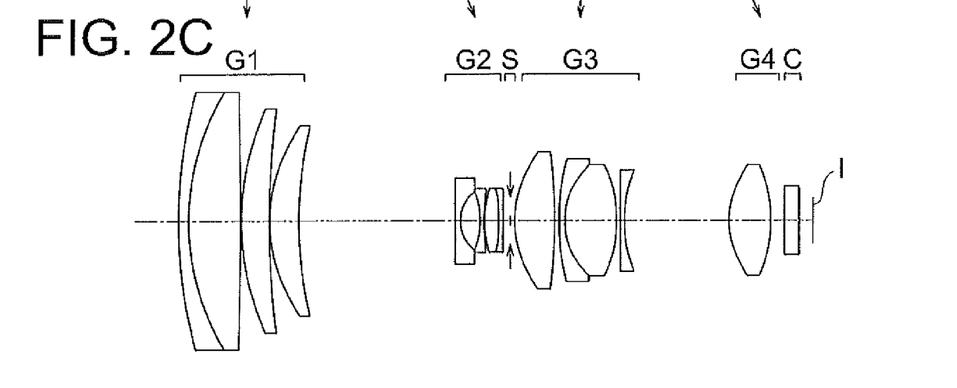

Lens cross-sectional views of the examples will be described below. FIG. 1A and FIG. 2A are lens cross-sectional views at a wide angle end, FIG. 1B and FIG. 2B are lens cross-sectional views in an intermediate focal length state, and FIG. 1C and FIG. 2C are lens cross-sectional views at a telephoto end.

Figure 3A:
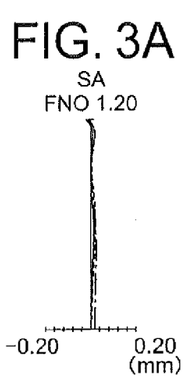
FIG. 3A, FIG. 3B, FIG. 3C, FIG. 3D, FIG. 3E, FIG. 3F, FIG. 3G, FIG. 3H, FIG. 3I, FIG. 3J, FIG. 3K, and FIG. 3L are aberration diagrams at the time of focusing to an object at infinity of the zoom lens according to the example 1.
Figure 3B:
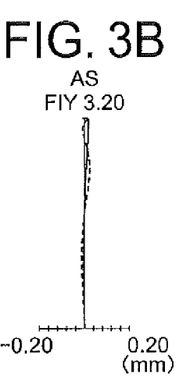
Figure 3C:
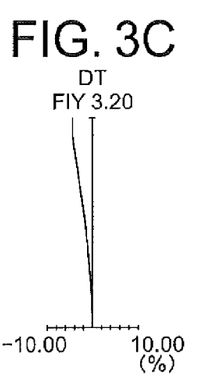
Figure 3D:
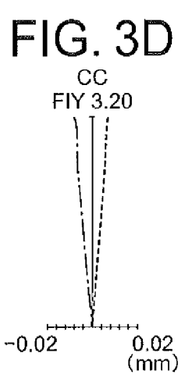
Figure 4A:
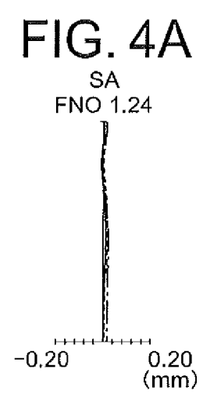
FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L are aberration diagrams at the time of focusing to an object at infinity of the zoom lens according to the example 2.
Figure 4B:
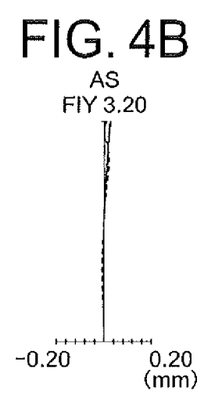
Figure 4C:
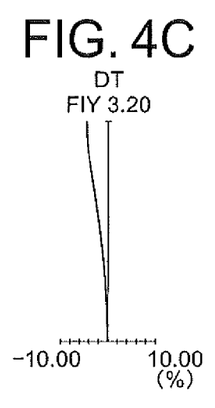
Figure 4D:
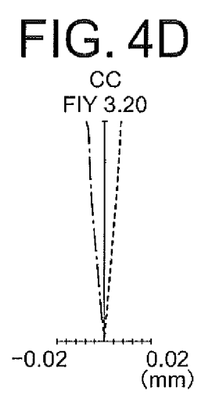

Aberrations diagrams of the examples will be described below. FIG. 3A and FIG. 4A show a spherical aberration (SA) at the wide angle end, FIG. 3B and FIG. 4B show an astigmatism (AS) at the wide angle end, FIG. 3C and FIG. 4C show a distortion (DT) at the wide angle end, and FIG. 3D and FIG. 4D show a chromatic aberration of magnification (CC) at the wide angle end.

Figure 3E:
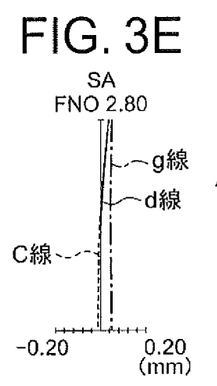
Figure 3F:
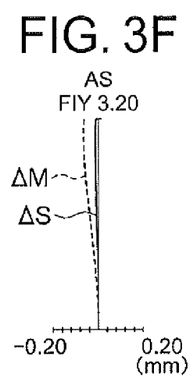
Figure 3G:
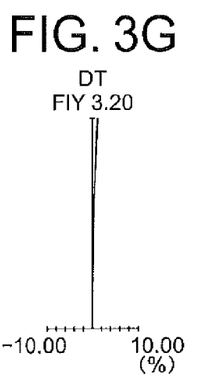
Figure 3H:
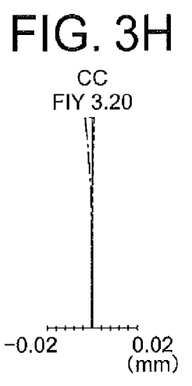
Figure 4E:
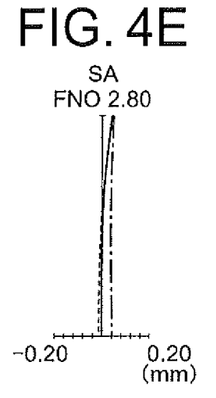
Figure 4F:
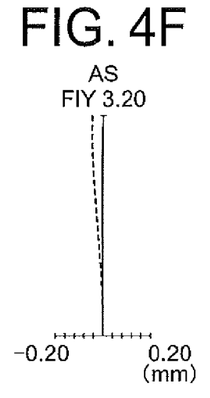
Figure 4G:
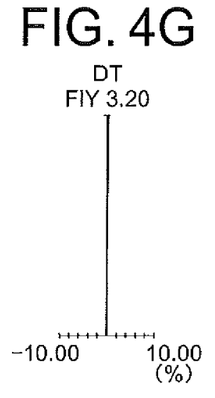
Figure 4H:
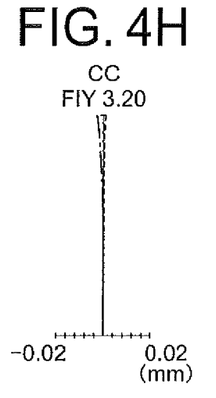

FIG. 3E and FIG. 4E show a spherical aberration (SA) in the intermediate focal length state, FIG. 3F and FIG. 4F show an astigmatism (AS) in the intermediate focal length state, FIG. 3G and FIG. 4G show a distortion (DT) in the intermediate focal length state, and FIG. 3H and FIG. 4H show a chromatic aberration of magnification (CC) in the intermediate focal length state.

Figures 3I, 3J:
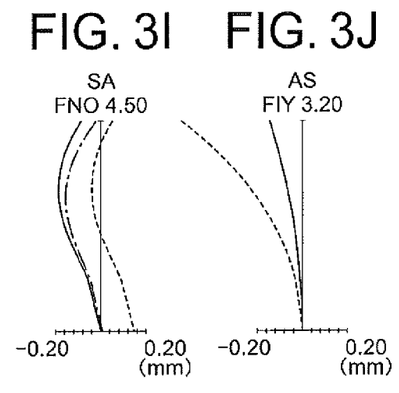
Figure 3K:
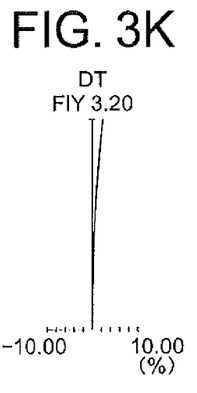
Figure 3L:
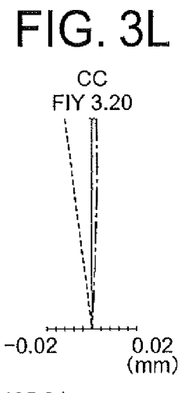
Figure 4I:
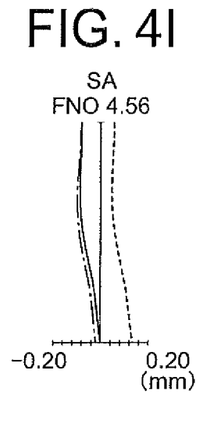
Figure 4J:
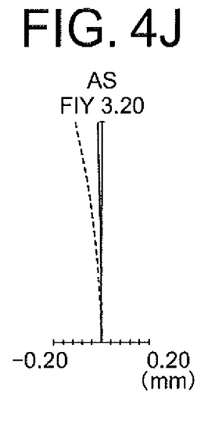
Figure 4K:
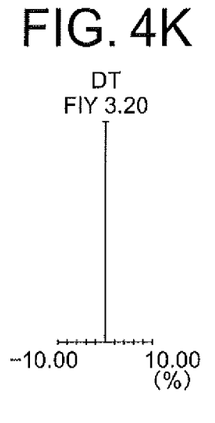
Figure 4L:
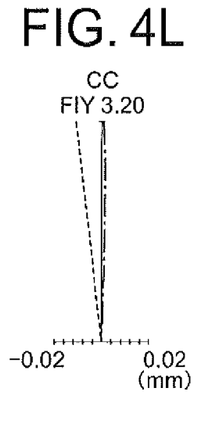

FIG. 3I and FIG. 4I show a spherical aberration (SA) at the telephoto end, FIG. 3J and FIG. 4J show an astigmatism (AS) at the telephoto end, FIG. 3K and FIG. 4K show a distortion (DT) at the telephoto end, and FIG. 3L and FIG. 4L show a chromatic aberration of magnification (CC) at the telephoto end.

A first lens unit is denoted by G1, a second lens unit is denoted by G2, a third lens unit is denoted by G3, a fourth lens unit is denoted by G4, an aperture stop is denotes by S, and an image plane (image pickup plane) is denoted by I. Moreover, a cover glass C of an image pickup element is disposed between the fourth lens unit G4 and the image plane I.

Moreover, for cutting unnecessary light such as ghost and flare, a flare aperture may be disposed apart from the aperture stop. The flare aperture may be disposed at any of locations namely, on the object side of the first lens unit, between the first lens unit and the second lens unit, between the second lens unit and the third lens unit, between the third lens unit and the fourth lens unit, and between the fourth lens unit and the image plane.

An arrangement may be made such that a frame member is used as a light shielding portion of the flare aperture, or some other member may be used as the light shielding portion. Moreover, the light shielding portion may be printed directly on the optical system, or may be painted directly on the optical system. Moreover, a seal etc. may be stuck directly on the optical system as the light shielding portion.

A shape of the shielding portion may be any shape such as a circular shape, an elliptical shape, a rectangular shape, a polygonal shape, and a range surrounded by a function curve. Not only unnecessary light beam but also a light beam such as coma flare around a screen may be cut.

The ghost and the flare may be reduced by applying an antireflection coating on each lens. multilayer coating is desirable as it enables to reduce the ghost and the flare effectively. Moreover, infrared-cutting coating may be applied to lens surfaces and the cover glass.

For preventing the occurrence of the ghost and the flare, generally, the antireflection coating is applied to a surface of a lens in contact with air. On the other hand, at a cemented surface of a cemented lens, a refractive index of an adhesive is sufficiently higher than a refractive index of air. Therefore, in many cases, a reflectance is originally of the level of a single-layer coating or lower. Therefore, coating is applied to a cemented surface of a cemented lens only in few cases. However, when the antireflection coating is applied positively even to the cemented surface, it is possible to reduce further the ghost and the flare. Therefore, it is possible to achieve a more favorable image.

Particularly, recently, a glass material having a high refractive index has been used widely. The glass material having a high refractive index, being highly effective in aberration correction, has been used widely in an optical system of cameras. However, when the glass material having a high refractive index is used as a cemented lens, even a reflection at the cemented surface becomes unignorable. In such a case, applying the antireflection coating on the cemented surface is particularly effective.

An effective usage of the cemented-surface coating has been disclosed in Japanese Patent Application Laid-open Publication Nos. Hei 2-27301, No. 2001-324676, No. 2005-92115, and U.S. Pat. No. 7,116,482.

In these patent literatures, a cemented lens surface coating in a first lens unit of a positive-lead zoom lens in particular, has been described. It is preferable to apply the cemented surface coating to the cemented lens surface in the first lens unit having a positive refractive power as it has been disclosed in these patent literatures.

As a coating material to be used, according to a refractive index of the adhesive material and a refractive index of the lens which is abase, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness that satisfies phase conditions.

Naturally, similar to the coating on the surface of the lens in contact with air, the coating on the cemented surface may also be let to be a multilayer coating. By combining appropriately a film thickness and a coating material of number of films not less than in two layers, it is possible to reduce further the reflectance, and to control spectral characteristics and angular characteristics of reflectance. Moreover, it is needless to mention that for the cemented surface of lenses other than the lenses in the front lens unit, it is effective to apply the coating on the cemented surface based on a similar idea.

A zoom lens according to an example 1 includes in order from an object side, a first lens unit G1 having a positive refractive power, a second lens unit G2 having a negative refractive power, a third lens unit G3 having a positive refractive power, and a fourth lens unit G4 having a positive refractive power. An aperture stop (stop) S is disposed between the second lens unit G2 and the third lens unit G3.

The first lens unit G1 includes a negative meniscus lens L1 having a convex surface directed toward the object side, a biconvex positive lens L2, a positive meniscus lens L3 having a convex surface directed toward the object side, and a positive meniscus lens L4 having a convex surface directed toward the object side. Here, the negative meniscus lens L1 and the biconvex positive lens L2 are cemented.

The second lens unit G2 includes a biconcave negative lens L5, a biconcave negative lens L6, a biconvex positive lens L7, and a biconcave negative lens L8. Here, the biconvex positive lens L7 and the biconcave negative lens L8 are cemented.

The third lens unit G3 includes a biconvex positive lens L9, a negative meniscus lens L10 having a convex surface directed toward the object side, a biconvex positive lens L11, and a planoconcave negative lens L12. Here, the negative meniscus lens L10 and the biconvex positive lens L11 are cemented.

The fourth lens unit G4 includes a biconvex positive lens L13.

At the time of zooming from a wide angle end to a telephoto end, the first lens unit G1 is fixed, the second lens unit G2 moves toward an image side, the third lens unit G3 is fixed, and the fourth lens unit G4, after moving toward the object side, moves toward the image side. The aperture stop S is fixed.

At the time of focusing from an object at infinity to an object at a close distance, only the fourth lens unit G4 moves toward the object side along an optical axis.

At the time of correcting image blur, the planoconcave negative lens L12 moves in a direction orthogonal to the optical axis.

An aspheric surface is provided to a total of six surfaces namely, both surfaces of the biconcave negative lens L5, both surfaces of the biconvex positive lens L9, and both surfaces of the biconvex positive lens L13.

A zoom lens according to an example 2 includes in order from an object side, a first lens unit G1 having a positive refractive power, a second lens unit G2 having a negative refractive power, a third lens unit G3 having a positive refractive power, and a fourth lens unit G4 having a positive refractive power. An aperture stop (stop) S is disposed between the second lens unit G2 and the third lens unit G3.

The first lens unit G1 includes a negative meniscus lens L1 having a convex surface directed toward the object side, a biconvex positive lens L2, a positive meniscus lens L3 having a convex surface directed toward the object side, and a positive meniscus lens L4 having a convex surface directed toward the object side. Here, the negative meniscus lens L1 and the biconvex positive lens L2 are cemented.

The second lens unit G2 includes a biconcave negative lens L5, a biconcave negative lens L6, a biconvex positive lens L7, and a planoconcave negative lens L8. Here, the biconvex positive lens L8 and the planoconcave negative lens L8 are cemented.

The third lens unit G3 includes a biconvex positive lens L9, a negative meniscus lens L10 having a convex surface directed toward the object side, a biconvex positive lens L11, and a planoconcave negative lens L12. Here, the negative meniscus lens L10 and the biconvex positive lens L11 are cemented.

The fourth lens unit G4 includes a biconvex positive lens L13.

At the time of zooming from a wide angle end to a telephoto end, the first lens unit G1 is fixed, the second lens unit G2 moves toward an image side, the third lens unit G3 is fixed, and the fourth lens unit G4, after moving toward the object side, moves toward the image side. The aperture stop S is fixed.

At the time of focusing from an object at infinity to an object at a close distance, only the fourth lens unit G4 moves toward the object side along an optical axis.

At the time of correcting image blur, the planoconcave negative lens L12 moves in a direction orthogonal to the optical axis.

An aspheric surface is provided to a total of six surfaces namely, both surfaces of the biconcave negative lens L5, both surfaces of the biconvex positive lens L9, and both surfaces of the biconvex positive lens L13.

Numerical data of each example described above is shown below. In Surface data, r denotes radius of curvature of each lens surface, d denotes a distance between respective lens surfaces, nd denotes a refractive index of each lens for a d-line, vd denotes an Abbe number for each lens and *denotes an aspheric surface.

Further, in Zoom data, WE denotes a wide angle end, ST denotes a intermediate focal length state, TE denotes a telephoto end. Further, f denotes a focal length of the entire system, FNO. denotes an F number, ω denotes a half angle of view, IH denotes an image height, BF denotes a back focus, LTL denotes a lens total length of the optical system. Further, back focus is a unit which is expressed upon air conversion of a distance from a rearmost lens surface to a paraxial image surface. The lens total length is a distance from a frontmost lens surface to the rearmost lens surface plus back focus.

Further, in Unit focal length, each of f1, f2 . . . is a focal length of each lens unit.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, A12 . . . .

$$Z=(y^2/r)/[1+\{1-(1+k)(y/r)^2\}^{1/2}]+A4y^4+A6y^6+A8y^8+A10y^{10}+A12y^{12}+\ldots$$

Further, in the aspherical surface coefficients, 'E-n' (where, n is an integral number) indicates '$10^{-n}$'. Moreover, these symbols are commonly used in the following numerical data for each example.

Example 1

| Unit mm | | | | |
|---|---|---|---|---|
| Surface data | | | | |
| Surface no. | r | d | nd | vd |
| Object plane | ∞ | ∞ | | |
| 1 | 71.419 | 1.40 | 1.85478 | 24.80 |
| 2 | 36.381 | 7.06 | 1.55032 | 75.50 |
| 3 | −672.762 | 0.15 | | |
| 4 | 39.700 | 3.97 | 1.49700 | 81.61 |
| 5 | 156.534 | 0.15 | | |
| 6 | 24.143 | 4.07 | 1.59282 | 68.62 |
| 7 | 66.624 | Variable | | |
| 8* | −281.509 | 0.80 | 1.85075 | 40.16 |
| 9* | 6.138 | 3.01 | | |
| 10 | −11.515 | 0.50 | 1.88300 | 40.76 |
| 11 | 39.674 | 0.20 | | |
| 12 | 16.558 | 2.00 | 1.95906 | 17.47 |
| 13 | −29.462 | 0.60 | 1.88300 | 40.76 |
| 14 | 208.972 | Variable | | |
| 15 (Stop) | ∞ | 0.70 | | |
| 16* | 15.025 | 5.73 | 1.80476 | 40.87 |
| 17* | −42.613 | 0.64 | | |
| 18 | 34.742 | 0.80 | 2.00100 | 29.13 |
| 19 | 10.672 | 7.04 | 1.49700 | 81.61 |
| 20 | −19.187 | 0.50 | | |
| 21 | ∞ | 0.60 | 2.00100 | 29.13 |
| 22 | 19.262 | Variable | | |
| 23* | 11.339 | 5.90 | 1.49650 | 81.53 |
| 24* | −19.060 | Variable | | |
| 25 | ∞ | 2.10 | 1.51633 | 64.14 |
| 26 | ∞ | 2.00 | | |
| Image plane | ∞ | | | |

Aspherical surface data

8th surface k = 0.000
A4 = 7.34169e−04, A6 = −3.04967e−05, A8 = 5.75570e−07,
A10 = −4.09462e−09, A12 = −1.80017e−12, A14 = −3.28721e−14

9th surface k = 0.178
A4 = 7.01733e−04, A6 = −4.97451e−07, A8 = −7.74460e−07,
A10 = −1.54181e−08, A12 = 5.91867e−10, A14 = 3.15094e−11

16th surface k = −1.506
A4 = 1.28348e−05, A6 = 9.90350e−08, A8 = 1.47915e−10,
A10 = −7.94545e−12, A12 = 6.29618e−14

17th surface k = 4.047
A4 = 6.91809e−05, A6 = −9.47337e−08, A8 = 6.68213e−10,
A10 = −6.66817e−12, A12 = 4.29200e−14

23th surface k = 0.424
A4 = −1.40443e−04, A6 = −1.15485e−06, A8 = 1.53732e−08,
A10 = −7.80184e−10, A12 = 6.11828e−12

24th surface k = −0.418
A4 = 4.84814e−05, A6 = −2.12615e−08, A8 = −1.51684e−08,
A10 = −3.89414e−11, A12 = 2.85947e−12

| Zoom data | | | |
|---|---|---|---|
| | WE | ST | TE |
| f | 4.79 | 23.99 | 139.06 |
| Fno. | 1.20 | 2.80 | 4.50 |
| 2ω | 69.84 | 15.02 | 2.57 |
| IH | 3.20 | 3.20 | 3.20 |
| BF (in air) | 9.96 | 17.24 | 4.38 |

-continued

Unit mm

|   | | | |
|---|---|---|---|
| LTL (in air) | 89.26 | 89.26 | 89.26 |
| d7 | 0.50 | 15.48 | 22.02 |
| d14 | 22.77 | 7.79 | 1.25 |
| d22 | 10.23 | 2.95 | 15.80 |
| d24 | 6.58 | 13.85 | 1.00 |

Unit focal length

| f1 = 34.41 | f2 = −5.05 | f3 = 21.38 | f4 = 15.31 |
|---|---|---|---|

Example 2

Unit mm

Surface data

| Surface no. | r | d | nd | νd |
|---|---|---|---|---|
| Object plane | ∞ | ∞ | | |
| 1 | 71.478 | 1.40 | 1.85478 | 24.80 |
| 2 | 36.372 | 7.24 | 1.55032 | 75.50 |
| 3 | −672.762 | 0.15 | | |
| 4 | 38.653 | 3.99 | 1.49700 | 81.61 |
| 5 | 135.531 | 0.15 | | |
| 6 | 23.714 | 4.06 | 1.59282 | 68.63 |
| 7 | 64.535 | Variable | | |
| 8* | −269.601 | 0.80 | 1.85135 | 40.10 |
| 9* | 5.963 | 2.92 | | |
| 10 | −11.581 | 0.50 | 1.88300 | 40.76 |
| 11 | 31.642 | 0.10 | | |
| 12 | 15.697 | 2.00 | 1.95906 | 17.47 |
| 13 | −29.294 | 0.60 | 1.88300 | 40.76 |
| 14 | ∞ | Variable | | |
| 15 (Stop) | ∞ | 0.70 | | |
| 16* | 14.929 | 5.67 | 1.80610 | 40.88 |
| 17* | −44.292 | 0.47 | | |
| 18 | 33.819 | 0.80 | 2.00100 | 29.13 |
| 19 | 10.681 | 7.39 | 1.49700 | 81.61 |
| 20 | −19.333 | 0.50 | | |
| 21 | ∞ | 0.60 | 2.00100 | 29.13 |
| 22 | 19.611 | Variable | | |
| 23* | 11.171 | 5.90 | 1.49700 | 81.61 |
| 24* | −19.776 | Variable | | |
| 25 | ∞ | 2.10 | 1.51633 | 64.14 |
| 26 | ∞ | 2.00 | | |
| Image plane | ∞ | | | |

Aspherical surface data

8th surface k = 0.000
A4 = 7.04310e−04, A6 = −3.10092e−05, A8 = 5.91121e−07,
A10 = −4.04644e−09, A12 = 3.05772e−12, A14 = −1.72358e−13
9th surface k = 0.117
A4 = 7.15193e−04, A6 = −2.50281e−06, A8 = −7.87952e−07,
A10 = −3.07315e−08, A12 = 9.07384e−10, A14 = 5.38614e−11
16th surface k = −1.302
A4 = 7.16092e−06, A6 = 9.06954e−08, A8 = 4.09711e−10,
A10 = −9.74176e−12, A12 = 6.87749e−14
17th surface k = −1.583
A4 = 6.06033e−05, A6 = −1.13303e−07, A8 = 4.56807e−10,
A10 = −2.77046e−12, A12 = 2.55367e−14

-continued

Unit mm

23th surface k = 0.416
A4 = −1.35326e−04, A6 = −1.30733e−06, A8 = 1.91945e−08,
A10 = −8.36914e−10, A12 = 6.31021e−12
24th surface k = 0.509
A4 = 6.89041e−05, A6 = 1.52253e−07, A8 = −1.42276e−08,
A10 = −1.81730e−10, A12 = 4.72764e−12

Zoom data

|   | WE | ST | TE |
|---|---|---|---|
| f | 4.87 | 23.98 | 129.66 |
| Fno. | 1.24 | 2.80 | 4.56 |
| 2ω | 69.09 | 15.16 | 2.77 |
| IH | 3.20 | 3.20 | 3.20 |
| FB (in air) | 9.84 | 17.19 | 5.31 |
| LTL (in air) | 89.07 | 89.07 | 89.07 |
| d7 | 0.70 | 15.44 | 21.97 |
| d14 | 22.32 | 7.58 | 1.05 |
| d22 | 10.25 | 2.90 | 14.79 |
| d24 | 6.46 | 13.80 | 1.92 |

Unit focal length

| f1 = 34.40 | f2 = −5.02 | f3 = 21.06 | f4 = 15.33 |
|---|---|---|---|

Next, values of conditional expressions in each example are given below.

| Conditional expression | Example 1 | Example 2 |
|---|---|---|
| (1) ndp | 1.550 | 1.550 |
| (2) νdp | 75.50 | 75.50 |
| (3) νdpave | 75.24 | 75.25 |
| (4) f1/fw | 7.18 | 7.07 |
| (6) f2/fw | −1.05 | −1.03 |

Figure 5:
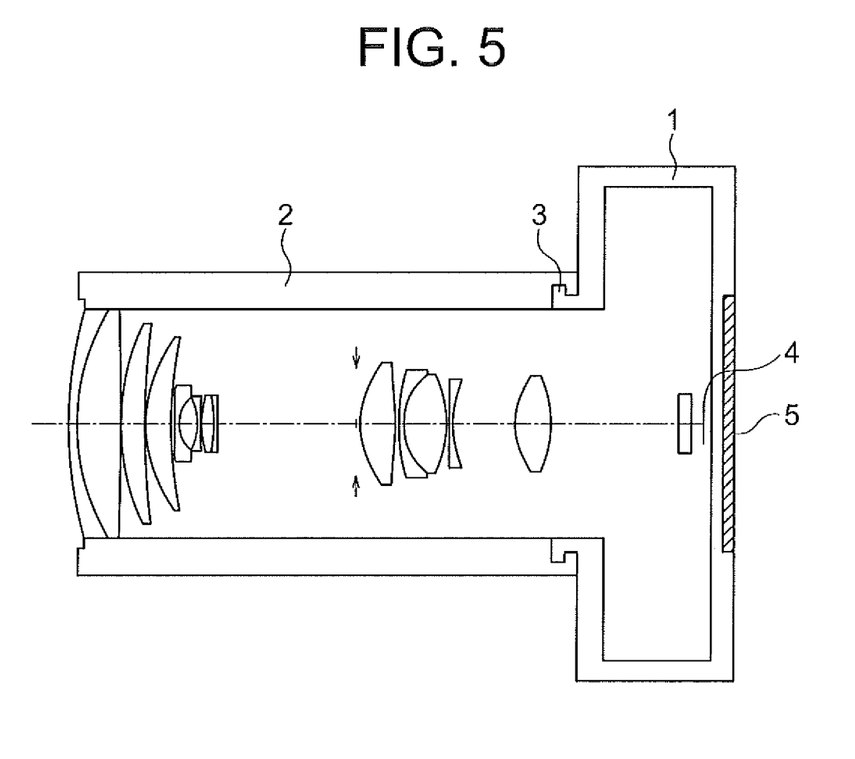
FIG. 5 is a cross-sectional view of an image pickup apparatus.

FIG. 5 is a cross-sectional view of a single-lens mirrorless camera as an electronic image pickup apparatus. In FIG. 5, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the zoom lens described in the first example or the second example is to be used.

Figure 6:
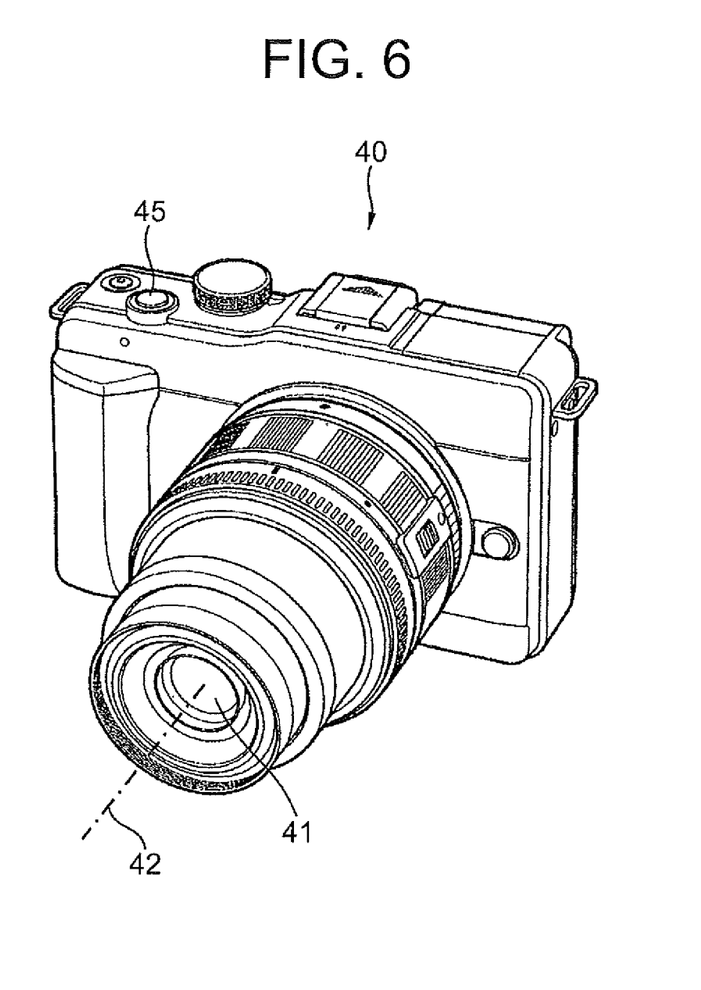
FIG. 6 is a front perspective view of the image pickup apparatus.
Figure 7:
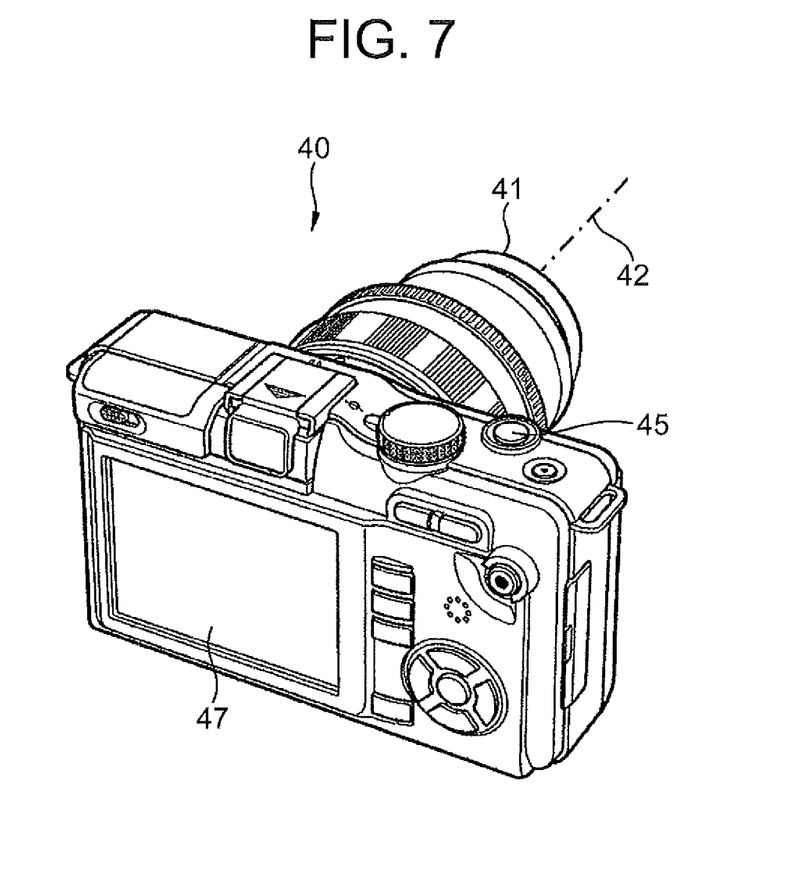
FIG. 7 is a rear perspective view of the image pickup apparatus.

FIG. 6 and FIG. 7 are conceptual diagrams of an arrangement of the image pickup apparatus. FIG. 6 is a front perspective view of a digital camera 40 as the image pickup apparatus, and FIG. 7 is a rear perspective view of the digital camera 40. The zoom lens according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 8:
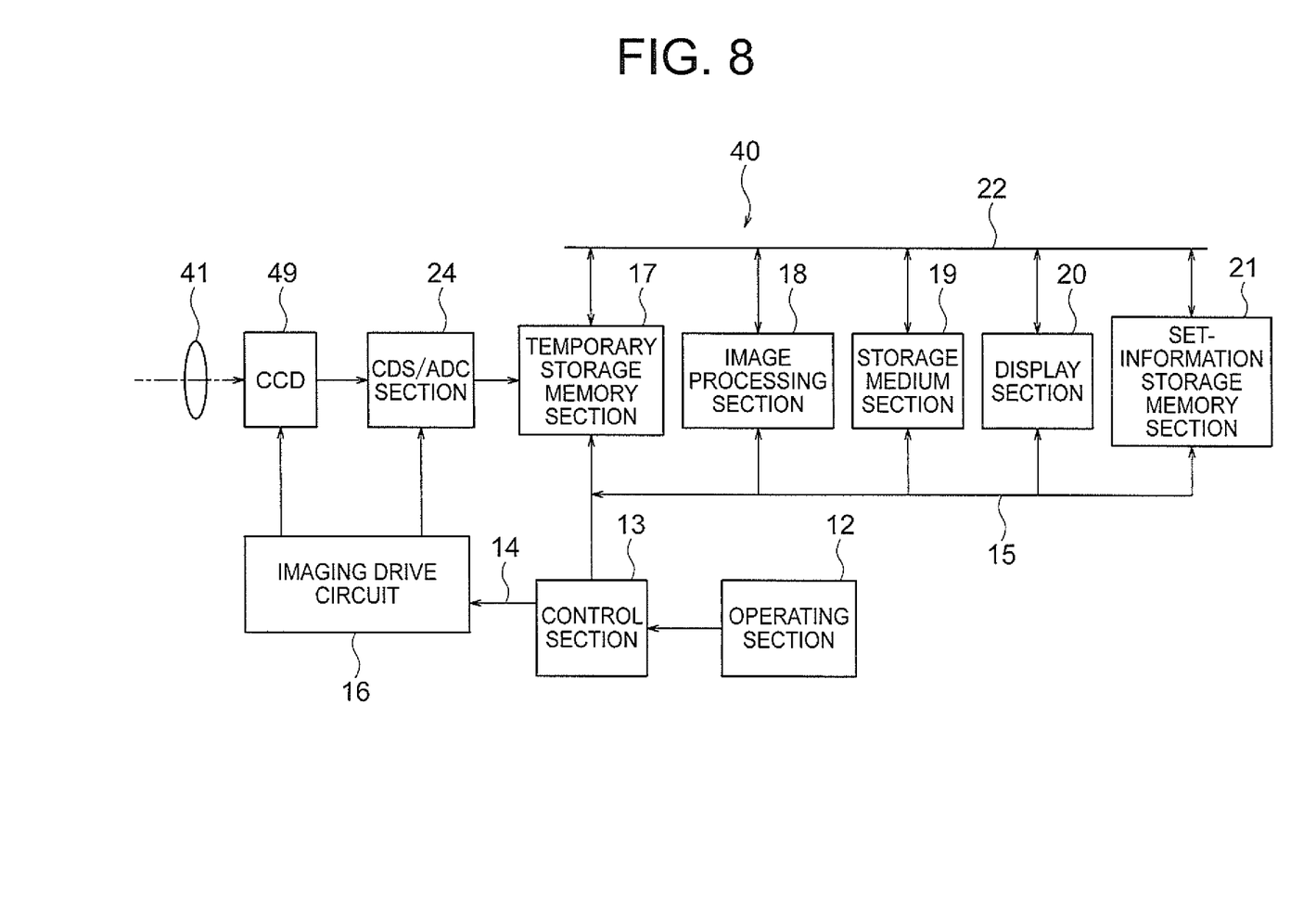
FIG. 8 is a structural block diagram of an internal circuit of main sections of the image pickup apparatus.

FIG. 8 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 8, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

The present invention can have various modified examples without departing from the scope of the invention. Moreover, shapes of lenses and the number of lenses are not necessarily restricted to the shapes and the number of lenses indicated in the examples. A lens that is not shown in the diagrams of the examples described above, and that does not have a refractive power practically may be disposed in a lens unit or outside the lens unit. In each of the examples described above, it is possible to make an arrangement such that the zoom lens includes four lens units practically.

According to the present embodiment, it is possible to provide a zoom lens having a high resolving power, a small F-number, and a small size, and an image pickup apparatus using such zoom lens.

As described heretofore, the embodiment of the present invention is suitable for a zoom lens having a high resolving power, a small F-number, and a small size, and an image pickup apparatus using such zoom lens.

What is claimed is:

1. A zoom lens comprising in order from an object side:
a first lens unit having a positive refractive power;
a second lens unit having a negative refractive power;
a third lens unit having a positive refractive power; and
a fourth lens unit having a positive refractive power, wherein
at the time of zooming from a wide angle end to a telephoto end, the first lens unit is fixed, and at least two lens units positioned on an image side of the first lens unit move, and
the first lens unit includes a plurality of lenses, and also has a cemented lens, and
a negative lens and a positive lens in the cemented lens are included in the plurality of lenses, and
the plurality of lenses includes at least one negative lens, and at least three positive lenses, and
the third lens unit comprises in order from the object side, a first sub lens unit having a positive refractive power, a second sub lens unit having a positive refractive power, and
a third sub lens unit having a negative refractive power, and
the second sub lens unit includes at least one negative lens and at least one positive lens, and
an image forming position is changed by moving the third sub lens unit in a direction perpendicular to an optical axis, and the following conditional expressions (1), (2), and (3) are satisfied:

$$1.5<ndp<1.65 \quad (1)$$

$$65<vdp<95 \quad (2)$$

$$65<vdpave<95 \quad (3)$$

where, ndp denotes a refractive index for a d-line of the positive lens in the cemented lens, vdp denotes Abbe's number for the positive lens in the cemented lens, and vdpave denotes an average Abbe's number for the positive lenses in the plurality of lenses.

2. The zoom lens according to claim 1, wherein the second lens unit includes at least three negative lenses, and at least one positive lens.

3. The zoom lens according to claim 1, wherein the fourth lens unit includes one positive lens, and moves at the time of zooming from the wide angle end to the telephoto end.

4. The zoom lens according to claim 1, wherein the third sub lens unit includes one negative lens.

5. A zoom lens comprising in order from an object side:
a first lens unit having a positive refractive power;
a second lens unit having a negative refractive power;
a third lens unit having a positive refractive power; and
a fourth lens unit having a positive refractive power, wherein
at the time of zooming from a wide angle end to a telephoto end, the first lens unit is fixed, and at least two lens units that are positioned on an image side of the first lens unit move, and
the third lens unit comprises in order from the object side, a first sub lens unit having a positive refractive power,
a second sub lens unit having a positive refractive power, and
a third sub lens unit having a negative refractive power, and
the second sub lens unit includes at least one negative lens and at least one positive lens, and
an image forming position is changed by moving the third sub lens unit in a direction perpendicular to an optical axis, and
the following conditional expressions (4) and (5) are satisfied:

$$4.0<f1/fw<9.0 \quad (4)$$

$$-1.2<f2/fw<-0.6 \quad (5)$$

where, f1 denotes a focal length of the first lens unit, f2 denotes a focal length of the second lens unit, and fw denotes a focal length at the wide angle end of the overall zoom lens system.

6. The zoom lens according to claim 5, wherein the first lens unit includes a plurality of lenses, and also has a cemented lens, and a negative lens and a positive lens in the cemented lens are included in the plurality of lenses, and the plurality of lenses includes at least one negative lens, and at least three positive lenses, and the following conditional expressions (1), (2), and (3) are satisfied $$1.5<ndp<1.65 \quad (1)$$

$$65<vdp<95 \quad (2)$$

$$65<vdpave<95 \quad (3)$$

where, ndp denotes a refractive index for a d-line of the positive lens in the cemented lens, vdp denotes Abbe's number for the positive lens in the cemented lens, and vdpave denotes an average Abbe's number for the positive lenses in the plurality of lenses.

7. The zoom lens according to claim 5, wherein the second lens unit includes at least three negative lenses, and at least one positive lens.

8. The zoom lens according to claim 5, wherein the fourth lens unit includes one positive lens, and moves at the time of zooming from the wide angle end to the telephoto end.

9. The zoom lens according to claim 5, wherein the third sub lens unit includes one negative lens.

10. An image pickup apparatus comprising:
a zoom lens described in claim 1; and
an image pickup element.

11. An image pickup apparatus comprising:
a zoom lens described in claim 5; and
an image pickup element.

* * * * *